Jan. 6. 1925.
C. H. PARSONS ET AL
1,522,384
EMULSIFICATION AND PASTEURIZATION OF CHEESE
Filed July 11, 1923
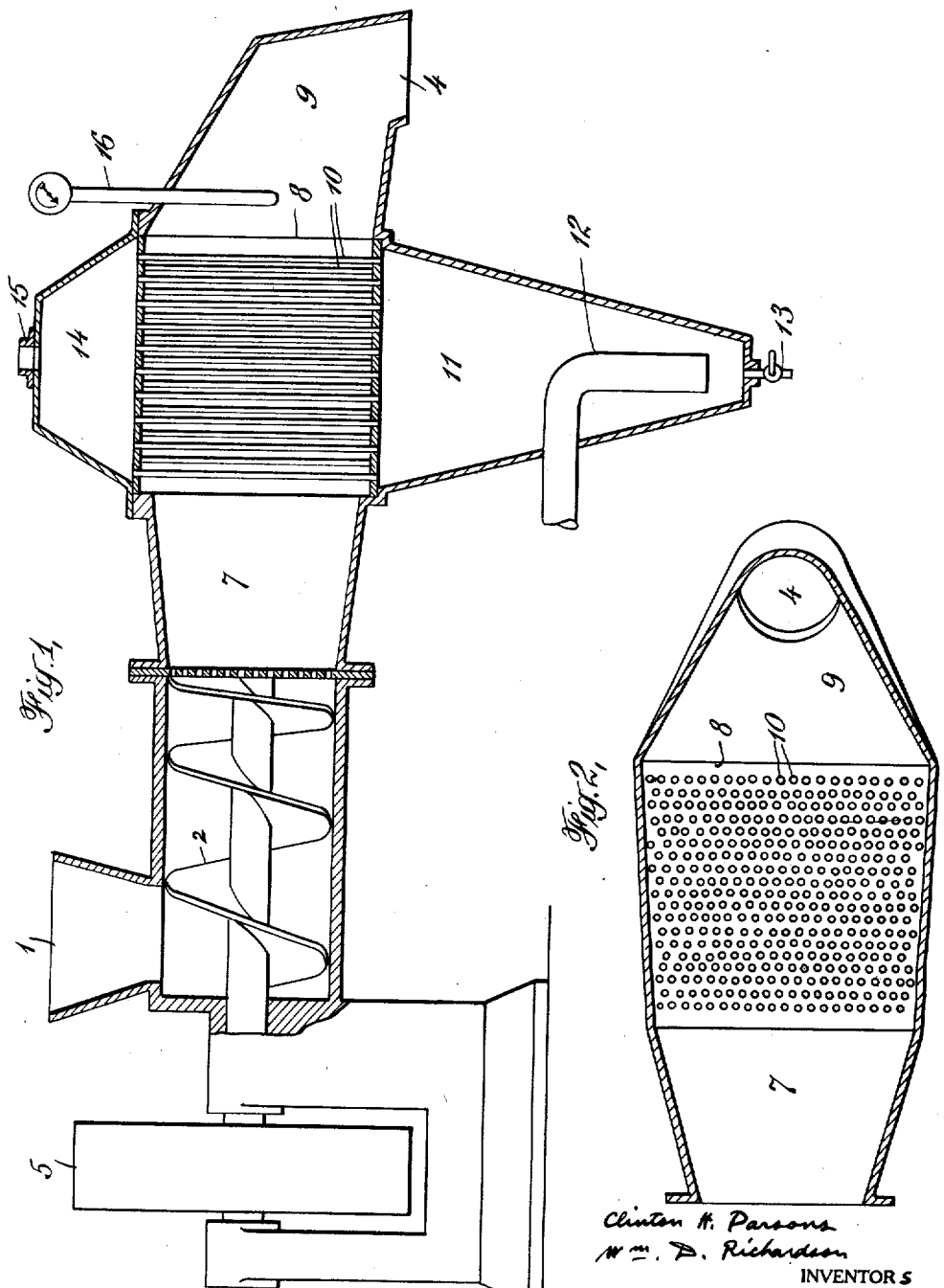

Patented Jan. 6, 1925.

1,522,384

UNITED STATES PATENT OFFICE.

CLINTON H. PARSONS AND WILLIAM D. RICHARDSON, OF CHICAGO, ILLINOIS, ASSIGNORS TO SWIFT & COMPANY, OF CHICAGO, ILLINOIS, A CORPORATION OF ILLINOIS.

EMULSIFICATION AND PASTEURIZATION OF CHEESE.

Application filed July 11, 1923. Serial No. 650,974.

*To all whom it may concern:*

Be it known that we, CLINTON H. PARSONS and WILLIAM D. RICHARDSON, citizens of the United States, both residing at Chicago, county of Cook, State of Illinois, have invented certain new and useful Improvements in Emulsification and Pasteurization of Cheese; and we do hereby declare the following to be a full, clear, and exact description of the invention, such as will enable others skilled in the art to which it appertains to make and use the same.

The present invention relates to a combined method of emulsification and subsequent pasteurization or sterilization of cheese, whereby the cheese is converted, as a result of the combined operations, into an emulsified and pasteurized or sterilized product. The invention also includes the novel cheese product produced by such process. The emulsification which precedes the pasteurization or sterilization is carried out in the cold or at a low temperature without the application of heat, or at most maintaining the heat at a very moderate temperature, preferably between 95 and 105° F. The combined emulsification and pasteurization (or sterilization) is advantageously carried out as a continuous process with the emulsifying apparatus operating as a forcing means for emulsifying the cheese and forcing the emulsified cheese continuously through the pasteurizer or sterilizer.

The cheese which is treated according to the process of the present invention may be either blended or unblended cheese and without or with additions such as pimento peppers, sage and other flavoring substances, etc. In making a blended cheese, for example, we may first take the cheese as received and proceed to grade it, if not already graded, according to kind, age and flavor, or, if graded, to re-grade it. The cheese is then cut, each kind separately, into coarse blocks, suitable for introduction into the grinding machines; the cheese is then ground in any suitable grinder or hasher, such, for example, as a hasher of the Enterprise type. The ground cheese may be received in trucks or suitable vessels, and weighed quantities, together with any admixtures such as pimento peppers, salt, emulsifying agents, powdered milk and the like, introduced into a suitable mixing machine in which the various ingredients are incorporated into an approximately homogeneous mass. The mixed cheese product thus produced may then be used as the material to be subjected to the low temperature emulsification and subsequent pasteurization; although cheese which has not been subjected to the preliminary grinding and mixing operations, but which is suitably comminuted, and blended if desired with other cheese or other admixtures, may be similarly used.

The suitably comminuted and prepared cheese is introduced into an emulsifying apparatus containing the necessary elements to control or provide rapid agitation or whipping or kneading or grinding of the cheese or cheese mixture without the production of a temperature in excess of 110° F. together with means for maintaining the cheese under a sufficient pressure to promote active emulsification. The apparatus should advantageously, but not necessarily, include means for propulsion of the cheese or cheese mixture therethrough, in combination with the other features above mentioned. A suitable emulsifying device may be an apparatus such as an Enterprise hasher or the equivalent which is so constructed as to permit the desired emulsification to take place therein. When an Enterprise hasher is employed, it may be provided with a plate having perforations of suitable size therein sufficient to produce a moderate back pressure when the machine is in operation.

When the cheese is introduced into the hopper of the machine, the machine is rotated at a fairly rapid rate in order to accomplish the emulsification, e. g., a rate four to six times as fast as the ordinary rate of rotation. The rate of rotation will vary with the size of the machine, e. g., 500–600 R. P. M. for large machines or 1000–1200 R. P. M. for small machines. The back pressure which is regulated by the perforations of the plate in the machine, or aided by a tapered spout or by a pasteurizing apparatus specially designed to produce back pressure, should be sufficient to prevent the easy slipping of the material as it would ordinarily be effected by the helical screw, so that in addition to the ordinary movement of propulsion, a considerable whipping and beating action is accomplished on the material. This has the effect in a very short time of producing an excellent emulsion which can then be softened or melted, in the pasteurizing or sterilizing operations, without material separation of its butter fat content.

We have ascertained that emulsification may not occur when the machine is first started into operation and that a certain time factor is requisite. However, when the emulsion once starts to form, it is able to maintain itself progressively. If the emulsion breaks or active emulsification ceases for any reason, then another period elapses before the emulsification is firmly re-established.

We have also discovered that emulsification can be started with greater ease and rapidity by the introduction into the hopper of cheese which has been previously emulsified, and that, when this is done, the emulsification process goes on in a satisfactory way. When unemulsified cheese is introduced continuously into the machine, the emulsification process propagates itself continuously when once established.

The cheese resulting from the low temperature emulsification above described is in a particularly advantageous condition for pasteurization or sterilization since, when heat is applied and the cheese is melted, butter fat separation does not occur, or not to a material degree.

In the combined emulsification and pasteurization (or sterilization) process of the present invention, advantage is taken of this property of the emulsified cheese; and the emulsification and pasteurization operations are combined into a unitary and continuous process in which the emulsified cheese is discharged directly into a pasteurizer or sterilizer and pasteurized or sterilized therein in a continuous manner, with the resulting continuous production of a pasteurized or sterilized cheese product suitable for packaging and retaining the advantages of the unpasteurized or unsterilized emulsified cheese. That is, the pasteurized cheese can be melted for cooking purposes, as in the making of Welsh rarebit, without objectionable butter fat separation.

In this combined emulsifying and pasteurizing process, the cheese is fed continuously to the emulsifier and is discharged therefrom in a continuous manner into the pasteurizer, advantage being taken of the propulsion of the cheese by the emulsifier to force it continuously through the pasteurizing apparatus.

It will be evident that the pasteurizing apparatus used for pasteurizing the emulsified cheese may vary considerably in its construction, but it is advantageously of such a construction and so combined with the emulsifying apparatus that the cheese can pass continuously from the emulsifier through the pasteurizer, and so that advantage may be taken of the back pressure caused by the pasteurizer and of the propelling action of the emulsifier for causing this flow of the emulsified cheese through the pasteurizer.

The pasteurizing apparatus is provided with heating surfaces around which and past which the cheese is forced. The heating surfaces may be arranged in different ways and may be heated by any suitable means. For example, the heating surfaces may be provided by tubes or by a honeycomb construction with hot water or other heating medium circulating through them, or parallel heating surfaces may be provided between which the cheese is forced, or electrically heated units of various designs and arrangements may be used.

The invention will be further described in connection with the accompanying drawing, showing a suitable form of apparatus for carrying out the combined emulsifying and pasteurizing (or sterilizing) operations.

In the accompanying drawings—

Fig. 1 shows the apparatus in a somewhat conventional and diagrammatic manner in elevation and with parts in vertical section; and Fig. 2 shows a horizontal sectional view of the pasteurizer.

In the apparatus illustrated, the emulsifying device is shown as a machine similar to an Enterprise hasher having a hopper 1 and helical screw 2 driven by suitable means such as a pulley 5. The emulsifier may have a perforated plate at its discharge end for assisting in creating a sufficient back pressure, as above described; although it will be evident that some back pressure will be caused by the pasteurizer itself and the friction of the cheese flowing through it. The back pressure on the emulsifier can be readily varied and regulated, as will be readily understood.

The pasteurizer illustrated comprises a pasteurizing chamber 8 provided with a set of tubes 10 placed rather closely together and through which hot water or other heating medium is circulated, and around which and between which the cheese is forced by the propelling mechanism. In the apparatus illustrated the pasteurizer has an inlet chamber 7 leading to the middle pasteurizing chamber 8 having the tubes 10 extending vertically therethrough. The discharge chamber 9 on the other side of the pasteurizing chamber has an outlet 4 for the pasteurized cheese.

Below the chamber 8 is a lower chamber 11 having an inlet 12 for the hot water or other heating medium and a drain cock 13 at the bottom. The heating medium enters the lower chamber and flows up through the tubes. It will be evident that the number of tubes as well as their arrangement can be varied. The tubes may be spaced as closely together as possible so long as they do not interfere with the proper flow of the cheese through the apparatus, and the amount of heating surface can thus be made relatively large. As a result, the heating medium can be maintained at a moderate temperature and the entire mass of cheese nevertheless heated to the desired temperature within a very short interval of time. This pasteurizing treatment may be considered a flash pasteurization. In so far as we are aware, cheese has not heretofore been considered capable of being pasteurized by such a process of flash pasteurization. In this process, the cheese is rapidly heated by contact for only a very short time with the heating surfaces.

The emulsifying apparatus, as above pointed out, also serves as a forcing or propelling means for forcing or propelling the emulsified cheese into and through the pasteurizer, and this cheese enters the pasteurizer in a cool or at most a luke warm condition. The temperature within the pasteurizer itself can be very carefully controlled, for example, by using hot water which is circulated through the tubes and maintaining it at 150° F. to 170° F., and by regulating the flow of the cheese so that the temperature of the cheese at the outlet of the pasteurizer as indicated by the thermometer 16 will be at a temperature of 145° F. By maintaining these temperatures and a continuous flow of cheese it will readily be seen that pasteurizing conditions can be maintained without giving to the cheese the cooked flavor due to local overheating characteristic of other processes in which the cheese is heated and agitated in a steam or hot water jacketed vessel.

The regulation of the pasteurizing or sterilizing operation can be effected by controlling the temperature and flow of the heating medium or by regulating the rate of flow of the cheese or by proper design of the pasteurizer. It will be evident that one or more of these three variables can be controlled to give the desired result. Where, for example, the rate of flow of the cheese is determined by the operation of the emulsifier, the pasteurizer can be properly proportioned for that rate of flow and the regulation of the pasteurizing operation can be further controlled by the temperature and flow of the heating medium. As a means for controlling the temperature ordinary thermometers and also recording thermometers may be maintained in the current of circulating water and also in the cheese at the outlet of the pasteurizer. A temperature of 145° F. in the cheese which has gone through the pasteurizer may be maintained in practice, or other suitable temperature can similarly be maintained. For example, if it is desired to sterlize the product more completely, temperatures may be applied within the tubes up to 212° F. with hot water or open steam or higher temperatures with steam under pressure.

It will thus be seen that the cheese can be pasteurized or sterilized in a continuous manner and with perfect temperature control, as distinguished from intermittent or batch processes.

As an example of the application of the present process we will refer to the treatment of a mixture made up of the following ingredients:

|  | Lbs. |
|---|---|
| Full cream cheese | 70 |
| Aged full cream cheese | 20 |
| Pimento peppers | 10 |

An emulsifying agent such as a small amount of soda or the equivalent may be added if desired. The addition of such an emulsifying agent materially promotes and facilitates the emulsification of the cheese.

This formula is susceptible of wide variation in producing a final product of uniform flavor. If the full cream cheese is quite fresh, more aged full cream cheese may be added. On the other hand, if the full cream cheese is older, less aged cheese may be used. In addition to pimento peppers, other flavoring substances may be added, such as salt, vinegar, pepper, sage, sugar, etc. Also for conferring special cheese flavors, other types of cheese may be used in the formula, such as Swiss, Roquefort, Limburger and others.

The different types of cheese are cut up and ground through a hasher and the amounts weighed as indicated. The batch made up of the various ingredients is introduced into a dough mixer and thoroughly mixed, after which it is fed by a feeding device into the hopper of the emulsifier where it is emulsified and converted into a product which can be melted without appreciable separation of butter fat. This emulsified and unpasteurized cheese may then be pasteurized or sterilized in the manner previously described. When it is pasteurized it is forced by the emulsifying apparatus into and through the pasteurizer. The time in the pasteurizer, depending on its size and construction, varies from 15 seconds to 1 minute, but by preference we employ a 40 second period for passage through the pasteurizer. From the spout of the pasteurizer the mix flows into the boxes or other receptacles.

It will be seen that the invention provides a continuous process for emulsifying and pasteurizing the cheese, so as to give directly and in a continuous manner an emulsified and pasteurized (or sterilized) cheese product.

In referring to the emulsification of the cheese at a low temperature and to the resulting product as an emulsified product we use the term "emulsified" to mean that the cheese can be melted without material butter fat separation so that it assumes in the liquid state the form of an emulsion.

The cheese product produced by the combined operations of the present invention is a new product, but we do not claim the same herein as it is claimed in a companion application; nor do we claim herein the pasteurization or sterilization process per se, but only in conjunction with the preliminary emulsification. The pasteurization (or sterilization) process per se is claimed in a companion application Serial No. 650,975; and the novel low temperature emulsification process per se, and the novel product produced thereby, are similarly claimed in a companion application Serial No. 650,976.

We claim:

1. The process of preparing cheese which comprises subjecting the cheese to emulsification at low temperature and then subjecting the emulsified cheese to a pasterizing or sterilizing temperature.

2. The process of preparing cheese which comprises subjecting the cheese to emulsification at low temperature with the addition of an emulsifying agent, then subjecting the emulsified cheese to a melting process and molding the same in packages.

3. The process of preparing cheese which comprises subjecting the same to emulsification at low temperature, then subjecting the emulsified cheese to a melting and sterilizing operation, and molding the resulting cheese in packages.

4. The process of preparing cheese which comprises subjecting the same to emulsification at low temperature with the addition of an emulsifying agent and in a continuous manner, and subjecting the resulting emulsified cheese to pasteurization or sterilization in a continuous manner.

5. The process of preparing cheese which comprises subjecting the same to emulsification at a low temperature and under pressure and forcing the resulting emulsified cheese through a pasteurizing or sterilizing chamber and into indirect contact with a heating medium, whereby the pasteurization or sterilization is effected in a continuous manner.

6. The process of preparing loaf cheese which comprises subjecting the cheese to emulsification at low temperature and then forcing the emulsified cheese into and through a pasteurizing chamber and subjecting the same therein to a pasteurizing temperature in a continuous manner.

7. The process of preparing cheese which comprises subjecting the cheese to emulsification at low temperature and then continuously forcing the emulsified cheese into close contact with heating means heated to a pasteurizing temperature.

8. The method of preparing cheese which comprises subjecting the cheese to emulsification at low temperature and then continuously forcing the emulsified cheese in close contact with a series of heating elements through which a heating medium is circulated.

9. The method of preparing cheese which comprises subjecting the cheese to emulsification at low temperature and then forcing the emulsified cheese continuously through a pasteurizing device and heating the same therein to a temperature of about 145° F.

10. The process of preparing cheese which comprises emulsifying the cheese at a low temperature and under pressure and forcing the emulsified cheese continuously through a pasteurizing device into intimate contact with heating means maintained at a temperature of about 150° F. to 170° F. and regulating the rate of flow of the emulsified cheese so that it is heated to a temperature of about 145° F.

11. The process of preparing cheese which comprises cutting and grinding the ordinary types of cheese, mixing them in the desired proportions with or without the addition of condimental substances, emulsifying the mixture at low temperature under pressure and with the addition of an emulsifying agent and passing the emulsified product through a pasteurizing apparatus in which it is brought to a pasteurizing temperature.

12. The process of preparing cheese which comprises cutting and grinding the ordinary types of cheese, mixing them in the desired proportions with or without the addition of condimental substances, emulsifying the mixture at low temperature under pressure and passing the emulsified product through a pasteurizing apparatus in which it is brought into intimate contact with a series of elements maintained at pasteurizing temperature.

13. The process of preparing cheese which comprises subjecting the cheese to emulsification at low temperature and then rapidly heating the emulsified cheese to a pasteurizing temperature by forcing the emulsified cheese continuously over heating surfaces with which it is brought into intimate contact for only a very short interval of time.

14. The process of preparing cheese which comprises subjecting the cheese to emulsification at low temperature and then rapidly heating the emulsified cheese to a pasteurizing temperature by forcing the emulsified cheese continuously over heating surfaces with which it is brought into intimate contact for only a very short interval of time, and causing the resulting cheese to flow in a substantially continuous manner to the packages therefor.

15. The process of preparing cheese which comprises subjecting the cheese to emulsification at low temperature, forcing the emulsified cheese into and through a pasteurizing chamber in a continuous manner and heating the same therein rapidly to the pasteurizing temperature by passage over heated surfaces with which the cheese is in contact for a period not to exceed about one minute.

16. The process of preparing cheese which comprises cutting and grinding the ordinary types of cheese, mixing them in the desired proportions with or without the addition of condimental substances, emulsifying the mixture at a low temperature under pressure, passing the emulsified product in a continuous manner through a pasteurizing apparatus in which it is rapidly heated to a pasteurizing temperature by intimate contact with heating surfaces for a very short period of time, and conveying the resulting cheese in a substantially continuous manner to the packages.

17. A new cheese product comprising emulsified and pasteurized cheese capable of being melted for cooking purpose as in the making of Welsh rabbit without appreciable butter fat separation, said product being produced by emulsification of the cheese at a low temperature and subsequent pasteurization by rapidly heating for a short period of time to the pasteurizing temperature and said product being free from overheated and overcooked constituents and from over-emulsification.

In testimony whereof we affix our signatures.

CLINTON H. PARSONS.
WILLIAM D. RICHARDSON.

tact for only a very short interval of time, and causing the resulting cheese to flow in a substantially continuous manner to the packages therefor.

15. The process of preparing cheese which comprises subjecting the cheese to emulsification at low temperature, forcing the emulsified cheese into and through a pasteurizing chamber in a continuous manner and heating the same therein rapidly to the pasteurizing temperature by passage over heated surfaces with which the cheese is in contact for a period not to exceed about one minute.

16. The process of preparing cheese which comprises cutting and grinding the ordinary types of cheese, mixing them in the desired proportions with or without the addition of condimental substances, emulsifying the mixture at a low temperature under pressure, passing the emulsified product in a continuous manner through a pasteurizing apparatus in which it is rapidly heated to a pasteurizing temperature by intimate contact with heating surfaces for a very short period of time, and conveying the resulting cheese in a substantially continuous manner to the packages.

17. A new cheese product comprising emulsified and pasteurized cheese capable of being melted for cooking purpose as in the making of Welsh rabbit without appreciable butter fat separation, said product being produced by emulsification of the cheese at a low temperature and subsequent pasteurization by rapidly heating for a short period of time to the pasteurizing temperature and said product being free from overheated and overcooked constituents and from over-emulsification.

In testimony whereof we affix our signatures.

CLINTON H. PARSONS.
WILLIAM D. RICHARDSON.

Certificate of Correction.

It is hereby certified that in Letters Patent No. 1,522,384, granted January 6, 1925, upon the application of Clinton H. Parsons and William D. Richardson, of Chicago, Illinois, for an improvement in "Emulsification and Pasteurization of Cheese," an error appears in the printed specification requiring correction as follows: Page 4, line 13, commencing with the word "but" strike out all to and through the word "we" in line 15 and insert instead *and forms a part of the invention. We do not;* and that the said Letters Patent should be read with this correction therein that the same may conform to the record of the case in the Patent Office.

Signed and sealed this 17th day of February, A. D. 1925.

[SEAL.]
KARL FENNING,
*Acting Commissioner of Patents.*

Certificate of Correction.

It is hereby certified that in Letters Patent No. 1,522,384, granted January 6, 1925, upon the application of Clinton H. Parsons and William D. Richardson, of Chicago, Illinois, for an improvement in "Emulsification and Pasteurization of Cheese," an error appears in the printed specification requiring correction as follows: Page 4, line 13, commencing with the word "but" strike out all to and through the word "we" in line 15 and insert instead *and forms a part of the invention. We do not;* and that the said Letters Patent should be read with this correction therein that the same may conform to the record of the case in the Patent Office.

Signed and sealed this 17th day of February, A. D. 1925.

[SEAL.]                                        KARL FENNING,
*Acting Commissioner of Patents.*